United States Patent
Osaki et al.

[11] Patent Number: 6,058,970
[45] Date of Patent: May 9, 2000

[54] REFUELING VAPOR RECOVERY SYSTEM WITH DIFFERENTIAL PRESSURE VALVE

[75] Inventors: Hiroshi Osaki; Hiroshi Shimamura, both of Sashima-gun; Katsuyuki Kido, Toyota, all of Japan

[73] Assignees: Kyosan Denki Co., Ltd., Sowa-Machi; Toyota Jidosha Kabushiki Kaisha, Toyota, both of Japan

[21] Appl. No.: 09/114,178

[22] Filed: Jul. 13, 1998

[30] Foreign Application Priority Data

Jul. 18, 1997 [JP] Japan ................................. 9-208338

[51] Int. Cl.[7] .................................................. F16K 24/04
[52] U.S. Cl. ........................... 137/587; 137/43; 137/202; 137/141; 137/59
[58] Field of Search ............................. 137/43, 202, 587, 137/588, 589; 123/519; 141/59

[56] References Cited

U.S. PATENT DOCUMENTS

| | | | |
|---|---|---|---|
| 5,054,508 | 10/1991 | Benjey | 137/43 |
| 5,417,240 | 5/1995 | Benjey | 137/587 |
| 5,462,100 | 10/1995 | Covert et al. | 141/59 |
| 5,524,662 | 6/1996 | Benjey et al. | 137/43 |
| 5,640,993 | 6/1997 | Kasugai et al. | 137/587 |
| 5,722,468 | 3/1998 | Kido | 141/59 |
| 5,931,183 | 8/1999 | Yoshihara | 137/202 |

FOREIGN PATENT DOCUMENTS

| | | |
|---|---|---|
| 8-276757 | 10/1996 | Japan . |
| 9-4526 | 10/1997 | Japan . |
| 10-18921 | 1/1998 | Japan . |

*Primary Examiner*—John Rivell
*Attorney, Agent, or Firm*—Oliff & Berridge, PLC

[57] ABSTRACT

A fuel vapor control apparatus halts deterioration in operating characteristics of a fuel control valve at the time of fuel supply and prevents fuel vapor from being discharged into the atmosphere through a filler pipe. The fuel vapor control apparatus prohibits fuel vapor from flowing toward a filler pipe by closing a fuel drop passage at the time of fuel supply. A fuel vapor control valve is configured as a diaphragm valve made of a flexible material, and a diaphragm holder moving integrally with the diaphragm valve is provided at the center thereof. Furthermore, the fuel drop passage as a communication hole is formed in the diaphragm portion at a location radially outward of the diaphragm holder, which is provided with an umbrella portion for opening and closing the fuel drop passage.

14 Claims, 7 Drawing Sheets

6,058,970

REFUELING VAPOR RECOVERY SYSTEM WITH DIFFERENTIAL PRESSURE VALVE

INCORPORATION BY REFERENCE

The disclosure of Japanese Patent Application No. HEI 9-208338 filed on Jul. 18, 1997 including the specification, drawings and abstract is incorporated herein by reference in its entirety.

BACKGROUND OF THE INVENTION

1. Field of Invention

The present invention relates to a fuel vapor control apparatus that prevents fuel vapor generated in a fuel tank of an internal combustion engine from being directly discharged into the atmosphere at the time of fuel supply and, more particularly, to an improved fuel vapor control apparatus that prevents a deterioration in operating characteristics of a fuel vapor control valve by returning fuel accumulated in the fuel vapor control apparatus to the fuel tank.

2. Description of Related Art

As a system for preventing fuel vapor generated in a fuel tank from being discharged into the atmosphere at the time of fuel supply by using a canister for adsorbing such fuel vapor, there is a fuel tank control system disclosed in Japanese Patent Application Laid-Open No. HEI 8-276757, which will now be described with reference to FIG. 9.

Referring to FIG. 9, a fuel tank 31 is connected with a canister 32 for adsorbing fuel vapor through a line 33, which is provided with a fuel vapor control apparatus 34. If the pressure of fuel vapor generated in the fuel tank 31 at the time of fuel supply reaches a predetermined set level, a fuel vapor control valve 34A installed in the fuel vapor control apparatus 34 is opened due to a difference in pressure, so that the fuel vapor flows into the canister 32. The fuel vapor is then adsorbed by an adsorbent contained in the canister 32 and temporarily stored therein. Upon start of an internal combustion engine, the fuel vapor that has been adsorbed by the canister 32 is sucked together with outside air, which is sucked into an outside air inlet 35 formed in the canister 32 due to a negative pressure generated in an intake pipe. The fuel vapor flows through a purge pipe 36 and the intake pipe and reaches cylinders of the internal combustion engine.

The aforementioned fuel vapor control apparatus operates as follows at the time of fuel supply.

When a filler cap 37 is opened to supply fuel, the atmospheric pressure is supplied to an upper chamber of the fuel vapor control apparatus 34 through a line 39 leading to a filler pipe 38, whereas the supply of fuel results in a rise in pressure in the fuel tank 31. Due to a difference in pressure between the upper chamber and the fuel tank 31, the fuel vapor control valve 34A of the fuel vapor control apparatus 34 is opened, so that fuel vapor flows through the line 33 and is stored in the canister 32. Thus, the fuel vapor is not discharged into the atmosphere through the filler pipe 38.

If a vehicle equipped with the fuel vapor control valve 34A of the fuel vapor control apparatus 34 of such a structure turns or is inclined, liquid fuel flows back through the filler pipe 38 and the line 39 and enters the upper chamber of the fuel vapor control valve 34A, so that there is a possibility of the liquid fuel being accumulated in the upper chamber of the fuel vapor control valve 34A.

With a view to preventing such accumulation of fuel, the aforementioned fuel vapor control apparatus adopts a structure wherein a communication hole 41 as a fuel drop passage is formed in the fuel vapor control valve 34A of the fuel vapor control apparatus 34.

Referring to FIGS. 10 and 11, the fuel vapor control valve 34A of the fuel vapor control apparatus 34 is composed of a diaphragm, which has the communication hole 41 formed in the vicinity of the center thereof. A guide piece 42 is disposed upright around the communication hole 41. A casing constituting the fuel vapor control apparatus 34 is provided with a closure member 43 fitted into the guide piece 42. The communication hole 41 is closed by an end 43A of the closure member 43 when the fuel vapor control valve 34A achieves a maximum upward lift amount due to a difference in pressure.

The fuel vapor control apparatus 34 is designed such that the fuel accumulated on the fuel vapor control valve 34A is returned to the fuel tank 31 through the communication hole 41. Thus, the operating characteristics of the fuel vapor control valve 34A are free from a deterioration due to a weight of the fuel accumulated on the fuel vapor control valve 34A.

Furthermore, since the communication hole 41 is closed by the end 43A of the closure member 43, there is no possibility of the fuel vapor generated in the fuel tank at the time of fuel supply being discharged into the atmosphere through the communication hole 41 and the filler pipe 38.

However, the communication hole 41 of the aforementioned fuel vapor control apparatus 34 has a structural drawback, which will hereinafter be described.

As can be seen from FIG. 10, there is a gap H formed between the fuel vapor control valve 34A and the end 43A of the closure member 43. Thus, at the time of fuel supply, the fuel vapor control valve 34A rises in height by the gap H due to a difference in pressure, so that the fuel vapor in the fuel tank 31 flows through the communication hole 41 prior to closure thereof. For this reason, the operating characteristics of the fuel vapor control valve 34A deteriorate and the fuel vapor that has flown through the communication hole 41 enters the filler pipe 38 through the line 39, whereby a small amount of fuel vapor is discharged into the atmosphere.

SUMMARY OF THE INVENTION

In view of this background, the present invention aims at eliminating the drawback of a fuel vapor control apparatus that is designed to return the fuel accumulated on a diaphragm to a fuel tank through a communication hole except at the time of fuel supply and to prevent fuel vapor from being discharged into the atmosphere by closing a fuel drop passage at the time of fuel supply. In other words, it is an object of the present invention to provide a fuel vapor control apparatus that halts deterioration in the operating characteristics of a fuel vapor control valve at the time of fuel supply and prevents fuel vapor from being discharged into the atmosphere by closing a communication hole in accordance with a difference in pressure regardless of an opening state of the fuel vapor control valve.

To achieve the aforementioned object, a fuel vapor control apparatus according to a first aspect of the present invention is configured as follows. That is, the fuel vapor control apparatus includes a fuel tank, a filler pipe having one end connected with the fuel tank and the other end provided with a filler cap, a canister for adsorbing fuel vapor generated in the fuel tank, a fuel vapor control valve disposed in a passage that allows communication between the fuel tank and the canister and divided into an upper chamber and a lower chamber, a fuel drop passage allowing communication between the upper chamber and the lower chamber, and a line connecting the inside of the upper chamber with a portion close to an end of the filler pipe on the side of the filler cap. The fuel vapor control valve is opened or closed due to a difference in pressure between the upper chamber and the lower chamber. This fuel vapor control apparatus has a valve mechanism that opens the fuel drop passage when substantially equal pressures are applied to the upper chamber and the lower chamber and closes the fuel drop passage when the pressure in the lower chamber is higher than the pressure in the upper chamber.

According to the first aspect of the present invention, there is a difference in pressure generated between the upper and lower chambers upon start of fuel supply, whereby the valve mechanism closes the fuel drop passage. It is thus possible to inhibit fuel vapor from being discharged into the atmosphere regardless of an opening state of the fuel vapor control valve.

A fuel vapor control apparatus according to a second aspect of the present invention is configured as follows. That is, the fuel vapor control apparatus includes a fuel tank, a filler pipe having one end connected with the fuel tank and the other end provided with a filler cap, a canister for adsorbing fuel vapor generated in the fuel tank, a fuel vapor control valve disposed in a passage that allows communication between the fuel tank and the canister and divided into an upper chamber and a lower chamber, a fuel drop passage allowing communication between the upper chamber and the lower chamber, and a line connecting the inside of the upper chamber with a portion close to an end of the filler pipe on the side of the filler cap. The fuel vapor control valve is opened or closed due to a difference in pressure between the upper chamber and the lower chamber. In this fuel vapor control apparatus, the fuel vapor control valve is provided with a diaphragm portion made of a flexible material and a diaphragm holder provided with an umbrella portion and coupled to the diaphragm portion to move integrally therewith. The umbrella portion closes the fuel drop passage at the time of fuel supply. The fuel drop passage is composed of a communication hole formed in the diaphragm portion.

According to the second aspect of the present invention, since the fuel vapor control valve is provided with the diaphragm portion made of a flexible material and the diaphragm holder having the umbrella portion that closes the fuel drop passage at the time of fuel supply, the pressure in the lower chamber becomes higher than the pressure in the upper chamber at the time of fuel supply, due to an internal pressure of fuel vapor inside the fuel tank. As a result, the diaphragm portion where the fuel drop passage is formed is pressed onto a bottom face of the umbrella portion of the diaphragm holder, whereby the fuel drop passage is closed. Therefore, it is possible to inhibit fuel vapor from being discharged into the atmosphere.

If the second aspect of the present invention is modified such that at the time of fuel supply, the umbrella portion closes the fuel drop passage before the fuel vapor control valve is opened, it is possible to more reliably inhibit fuel vapor from being discharged into the atmosphere.

In the second aspect of the present invention, the fuel vapor control apparatus may further include a sealing structure disposed outward of the communication hole to seal a gap between the diaphragm holder and the diaphragm portion. In this case, when the diaphragm portion is pressed onto the diaphragm holder, the fuel drop passage is reliably closed, so that it is possible to inhibit fuel vapor from being discharged into the atmosphere. Furthermore, the sealing structure may be composed of a circumferential abutment portion that can be integrated into the diaphragm portion or the diaphragm holder.

In addition, the second aspect of the present invention may be modified such that the diaphragm holder is coupled to the diaphragm portion in the vicinity of a center thereof and that a circumferential groove is formed in a top face and/or a bottom face of the diaphragm portion at a location radially inward of the communication hole. It is thus possible to eliminate a distortion caused on the top and/or bottom face of the diaphragm portion and to thereby inhibit the emergence of waviness thereon. Consequently, the diaphragm holder is more reliably in contact with the diaphragm, whereby it is possible to inhibit fuel vapor from being discharged into the atmosphere.

A fuel vapor control apparatus according to a third aspect of the present invention is configured as follows. That is, the fuel vapor control apparatus includes a fuel tank, a filler pipe having one end connected with the fuel tank and the other end provided with a filler cap, a canister for adsorbing fuel vapor generated in the fuel tank, a fuel vapor control valve disposed in a passage that allows communication between the fuel tank and the canister and divided into an upper chamber and a lower chamber, a fuel drop passage allowing communication between the upper chamber and the lower chamber, and a line connecting the inside of the upper chamber with a portion close to an end of the filler pipe on the side of the filler cap. The fuel vapor control valve is opened or closed due to a difference in pressure between the upper chamber and the lower chamber. In this fuel vapor control apparatus, the fuel vapor control valve is provided with a diaphragm portion having a check valve that closes the fuel drop passage at the time of fuel supply, and the fuel drop passage is composed of a communication hole formed in the diaphragm portion.

According to the third aspect of the present invention, when the pressure in the lower chamber becomes higher than the pressure in the upper chamber due to an internal pressure of fuel vapor inside the fuel tank at the time of fuel supply, the check valve closes the fuel drop passage. Therefore, it is possible to inhibit fuel vapor from being discharged into the atmosphere.

If the third aspect of the present invention is modified such that at the time of fuel supply, the check valve closes the fuel drop passage before the fuel vapor control valve is opened, it is possible to more reliably inhibit fuel vapor from being discharged into the atmosphere.

In addition, the check valve according to the third aspect of the present invention may be a duck bill valve, an umbrella valve or a check valve configured otherwise.

BRIEF DESCRIPTION OF THE DRAWINGS

Further objects, features and advantages of the present invention will become apparent from or are described in the following description of the preferred embodiments with reference to the accompanying drawings, wherein.

DETAILED DESCRIPTION OF PREFERRED EMBODIMENTS

Preferred embodiments of the present invention will now be described with reference to the accompanying drawings.

Figure 1:
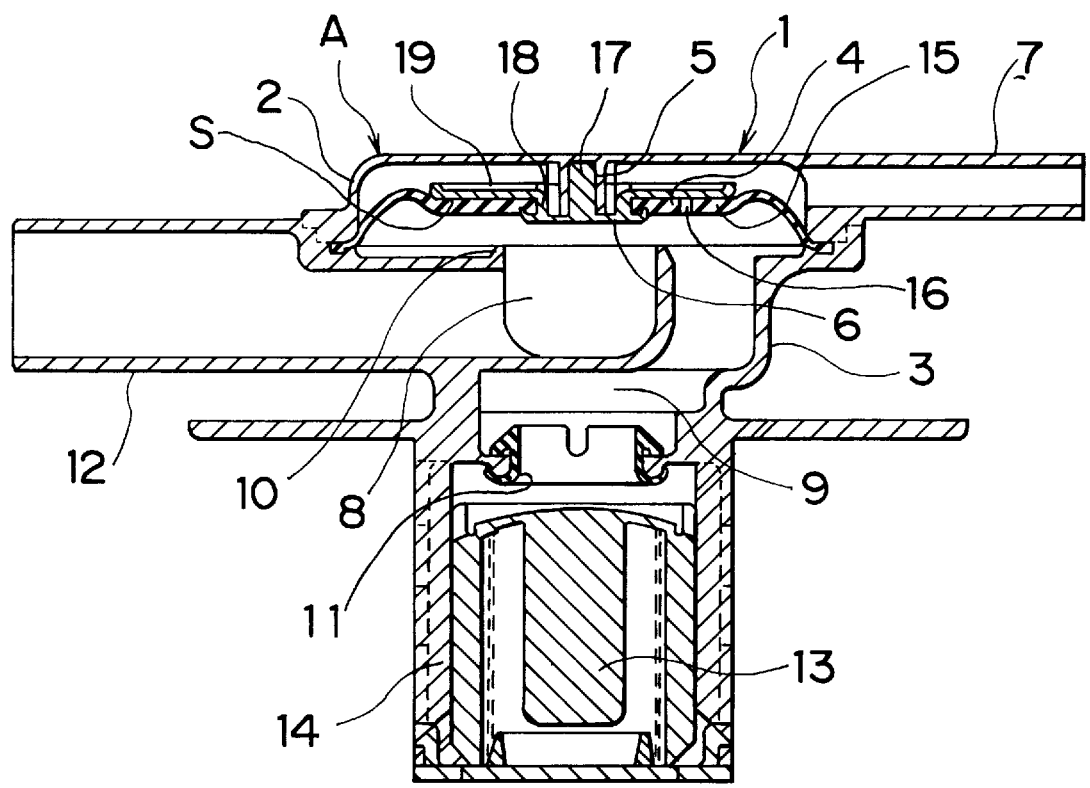
FIG. 1 is a sectional view of a fuel vapor control valve for fuel tanks according to an embodiment of the present invention in a state where a diaphragm valve is open.
Figure 2:
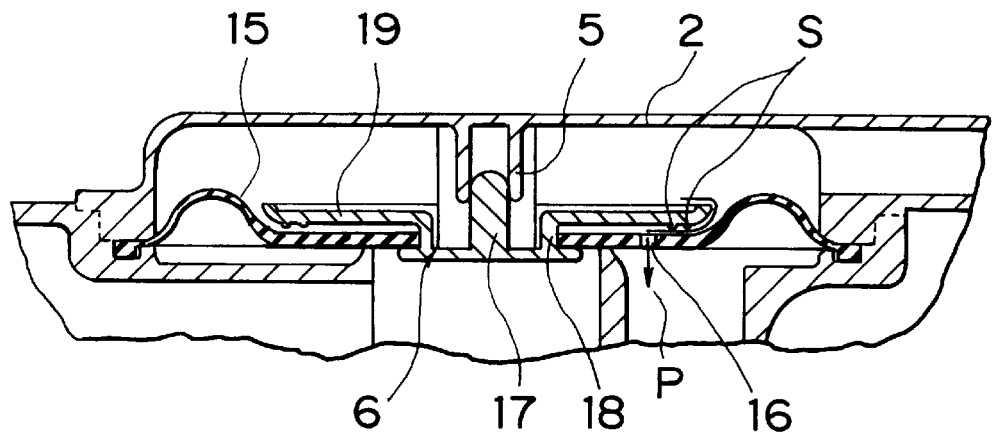
FIG. 2 is a partial sectional view of a state where the diaphragm valve as shown in FIG. 1 is closed.

FIG. 1 is a sectional view illustrating the structure of a fuel vapor control apparatus for fuel tanks according to an embodiment of the present invention. FIG. 2 is a partial sectional view illustrating a state where a communication hole as shown in FIG. 1 is open.

Referring to FIGS. 1 and 2, a fuel vapor control valve A is composed of a casing 1 and a diaphragm valve disposed within the casing 1. The casing 1 is composed of an upper casing 2 that defines a filler pipe internal pressure chamber made of synthetic resin or metal and a lower casing 3 that defines a fuel tank internal pressure chamber. The diaphragm valve 4 is made of a flexible material such as rubber, soft synthetic resin or the like. A tubular guide wall 5 is integrally formed on an upper wall of the upper casing 2 such that the guide wall 5 hangs down from the upper casing 2. The guide wall serves to guide a diaphragm holder 6, which will later be described. Provided in a side face of the upper casing 2 is a communication port 7 communicating with a filler pipe. The lower casing 3 has therein a first opening 8 for communication with a canister and a second opening 9 for communication with a fuel tank. The first and second openings 8 and 9 are provided with valve seat portions 10 and 11, respectively. Furthermore, a communication port 12 communicating with the canister and a float guide portion 14 guiding a float valve 13 are integrated into the first and second openings 8 and 9, respectively.

Figure 3:
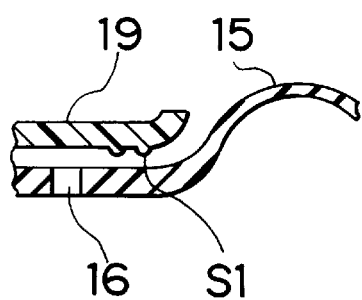
FIG. 3 is an enlarged sectional view of an abutment portion of the fuel vapor control valve according to an embodiment of the present invention in which the abutment portion is integrated into an umbrella portion.
Figure 4:
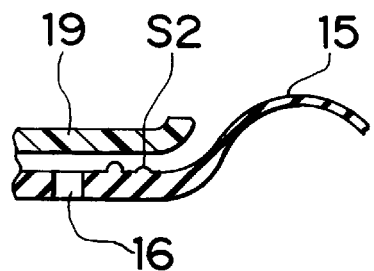
FIG. 4 is an enlarged sectional view of the abutment portion of the fuel vapor control valve according to an embodiment of the present invention wherein the abutment portion is integrated into a diaphragm.

The diaphragm valve 4 is sandwiched between the upper casing 2 and the lower casing 3 and divides the casing 1 into an upper chamber defined by the diaphragm valve 4 and the upper casing 2 and a lower chamber defined by the diaphragm valve 4 and the lower casing 3. In a closed state, the diaphragm valve 4 sits on the valve seat portion 10 and divides the lower chamber into the first opening 8 and the second opening 9, whereas in an open state, the diaphragm valve 4 allows communication between the first and second openings 8 and 9. The diaphragm valve 4 has in a central portion thereof the diaphragm holder 6. A diaphragm portion 15 is provided with a communication hole 16 as a fuel drop passage at a location radially outward of the diaphragm holder 6. The diaphragm holder 6 has a protruding portion 17 slidably moving inside the tubular guide wall 5, a holding portion 18 holding an edge of the diaphragm portion 15 and an umbrella portion 19 extending to cover the communication hole 16 of the diaphragm portion 15 from above. The diaphragm holder 6 operates together with the diaphragm valve 4. A circumferential abutment portion S is provided between the umbrella portion 19 and a location of the diaphragm portion 15 that is radially outward of the communication hole 16 to ensure airtightness therebetween. The abutment portion S is either an abutment portion S1 that is integrally formed on the side of the umbrella portion 19 as shown in FIG. 3 or an abutment portion S2 that is integrally formed on the side of the diaphragm portion 15 as shown in FIG. 4. In the case where the diaphragm portion 15 is deformed flexibly enough to reliably close the communication hole 16, the abutment portion S can be omitted. If substantially equal pressures are applied to the upper and lower chambers, a minute gap is formed between the diaphragm portion 15 and the diaphragm holder 6 (between the abutment portion S and the diaphragm holder 6, if the abutment portion S exists).

The float valve 13 is located inside the float guide portion 14 that is disposed within the fuel tank. Due to a rise in fuel level in the fuel tank, the float valve 13 is closed by rising to abut on the valve seat portion 11 in the second opening 9 of the lower casing 3. Due to a fall in fuel level in the fuel tank, the float valve 13 is opened.

Figure 5:
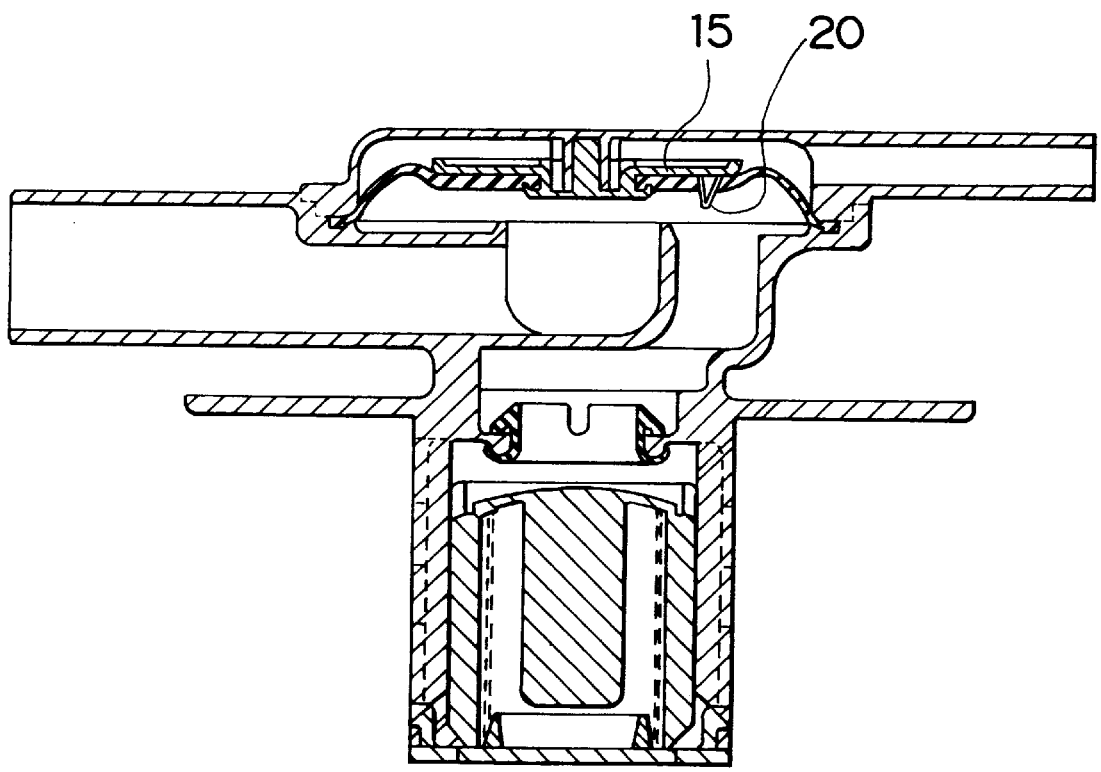
FIG. 5 is a sectional view illustrating another embodiment of the present invention wherein a duck bill valve is used as a fuel drop passage.

Although the diaphragm portion 15 is simply provided with the communication hole 16 in the aforementioned embodiment, the communication hole 16 may be replaced by a duck bill valve 20 as shown in FIG. 5. The duck bill valve 20 has a beak-shaped valve body made of a flexible material. If fluid flows in one direction (from the upper chamber to the lower chamber in FIG. 5), the beak-shaped valve body is opened due to fluid pressure, thus allowing the fluid to further flow in that direction. If fluid flows in the other direction (from the lower chamber to the upper chamber in FIG. 5), the beak-shaped valve body is closed due to fluid pressure, thus preventing the fluid from further flowing in that direction.

Figure 6:
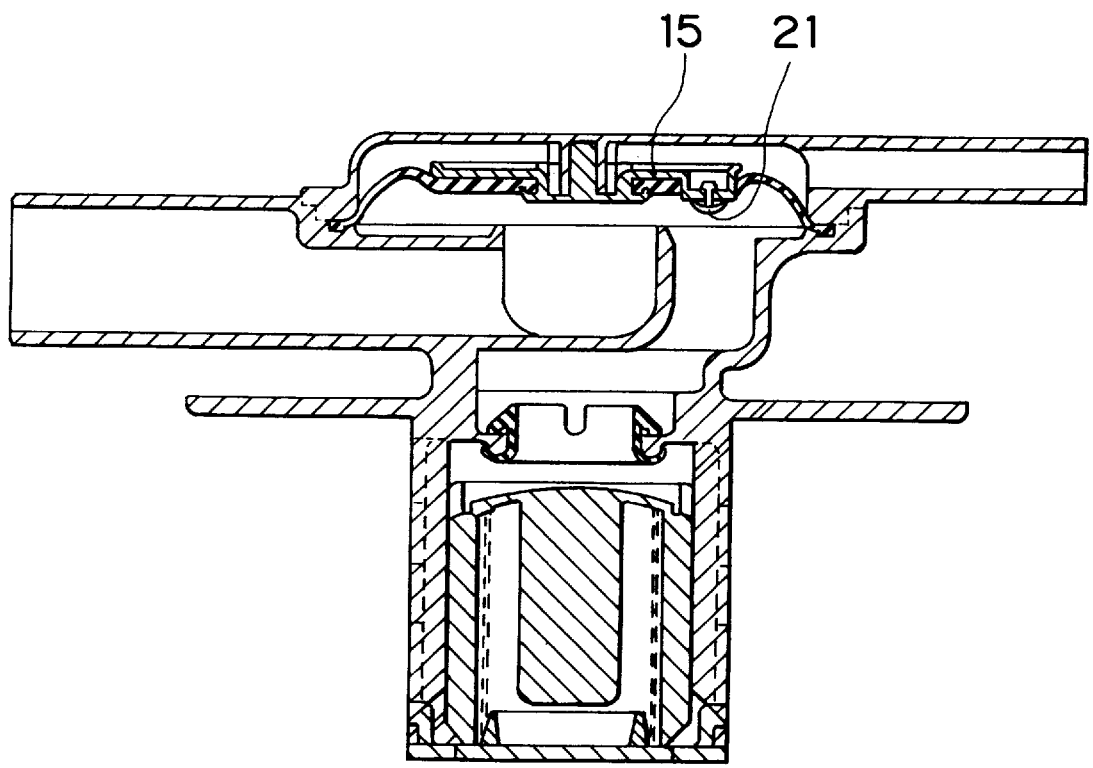
FIG. 6 is a sectional view illustrating still another embodiment of the present invention wherein an umbrella valve configured as another type of check valve is used.

Furthermore, it is apparent that a check valve configured otherwise, such as an umbrella valve 21 as shown in FIG. 6 may also be used. The umbrella valve 21 has an umbrella portion made of a flexible material. If fluid flows in one direction (from the upper chamber to the lower chamber in FIG. 6), the umbrella portion is opened due to fluid pressure, thus allowing the fluid to further flow in that direction. If fluid flows in the other direction (from the lower chamber to the upper chamber in FIG. 6), the umbrella portion is pressed onto the diaphragm portion and closed due to fluid pressure, thus preventing the fluid from further flowing in that direction.

The operation of the fuel vapor control apparatus for fuel tanks configured as described above will now be described with reference to FIGS. 1 and 2.

Except at the time of fuel supply, the fuel tank, the filler pipe and the communication port 7 communicate with one another, whereby substantially equal pressures are applied to the upper chamber and the lower chamber. In this state, the diaphragm valve 4 is closed as shown in FIG. 2. Fuel accumulated on the diaphragm valve 4 passes through a gap between the diaphragm portion 15 and the umbrella portion 19 of the diaphragm holder 6 and falls into the fuel tank as indicated by an arrow P in FIG. 2 through the communication hole 16 which serves as a fuel drop passage.

At the time of fuel supply, a filler cap is opened to feed fuel into the fuel tank. In this state, fuel is fed into the fuel tank, so that the pressure in the fuel tank is higher than the pressure in a mouth of the filler pipe.

When the pressure in the fuel tank becomes higher than the pressure in the filler pipe, the pressure in the lower chamber becomes higher than the pressure in the upper chamber, whereby the gap between the diaphragm 15 serving as a fuel drop passage and the umbrella portion 19 of the diaphragm holder 6 is closed. When the pressure in the lower chamber thereafter becomes even higher than the pressure in the upper chamber, the diaphragm valve 4 is opened. The diaphragm portion 15 and the umbrella portion 19 are disposed adjacent to each other. Thus, even if the diaphragm portion 15 has moved a little, the gap between the diaphragm 15 and the umbrella portion 19 is closed. Therefore, the fuel drop passage is closed prior to closure of the diaphragm valve 4. As a result, fuel vapor flows into the canister through the fuel tank, the second opening 9, the first opening 8 and a canister communication port 12 without flowing toward the filler pipe. It is thus possible to inhibit fuel vapor from being discharged into the atmosphere through the communication hole 16 at the time of fuel supply.

The fuel vapor control apparatuses of the embodiments as shown in FIGS. 3 and 4 operate in the same manner as the fuel vapor control apparatus of the embodiment as shown in FIGS. 1 and 2. That is, when the pressure in the lower chamber becomes higher than the pressure in the upper chamber at the time of fuel supply, the duck bill valve 20 or the umbrella valve 21 is closed. When the pressure in the lower chamber becomes even higher than the pressure in the upper chamber, the diaphragm valve 4 is opened. It is thus possible to inhibit fuel vapor from being discharged into the atmosphere through the duck bill valve 20 or the umbrella valve 21 at the time of fuel supply.

As described hitherto, the present invention is designed such that the diaphragm valve 4 is provided so as to separate the fuel tank internal pressure chamber, the filler pipe internal pressure chamber and the canister from one another, and that upon closure of the diaphragm valve 4, a passage leading to the communication hole 16 serving as a fuel drop passage formed in the diaphragm portion 15 is closed by the umbrella portion 19 of the diaphragm holder 6 and the diaphragm portion 15. Thus, the fuel tank (or the canister) does not communicate with the filler pipe.

A structure for improving a contact state between the umbrella portion 19 of the diaphragm holder 6 and the diaphragm valve 4 will now be described.

Figure 7:
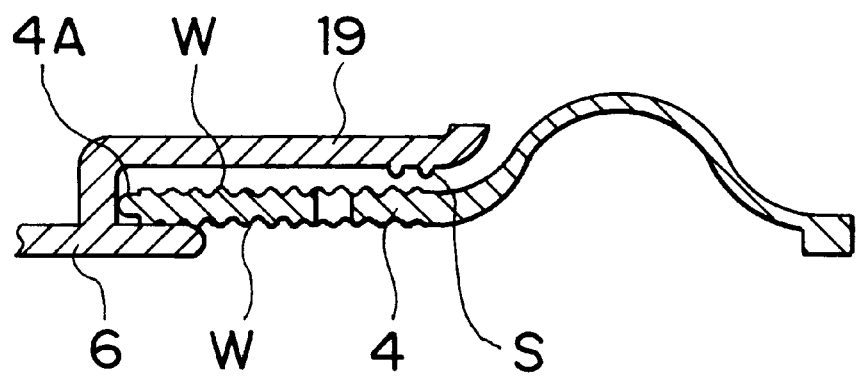
FIG. 7 is a schematic sectional view of a structure for holding the diaphragm valve according to an embodiment of the present invention.
Figure 8:
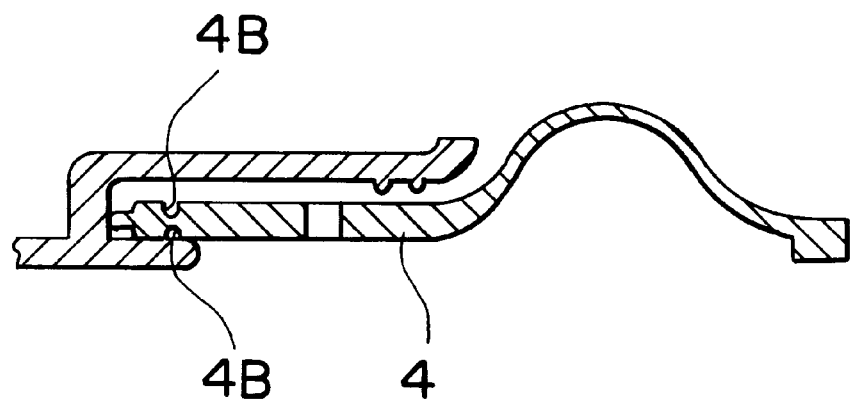
FIG. 8 is a schematic sectional view of a structure for holding the diaphragm valve according to an embodiment of the present invention.
Figure 9:
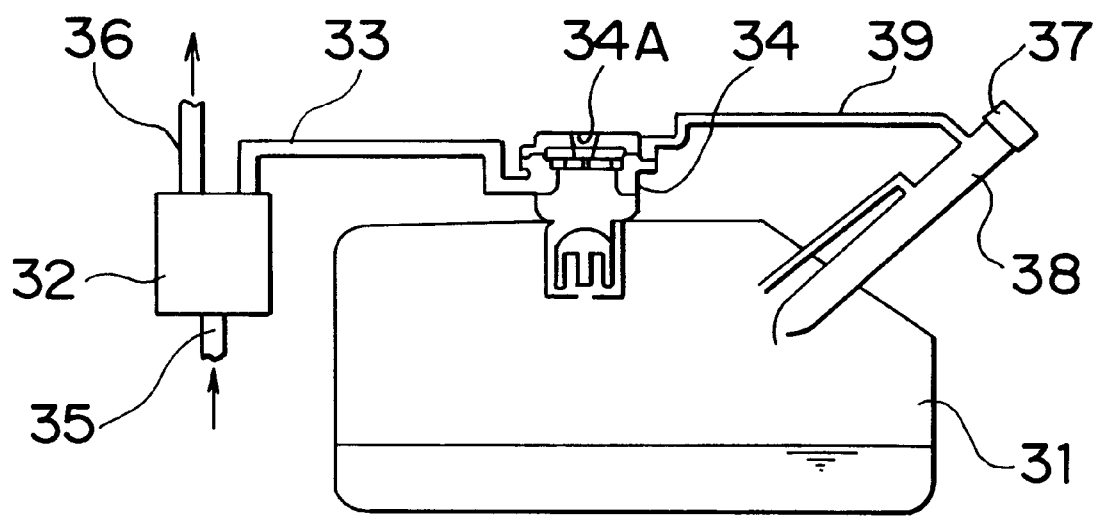
FIG. 9 is a systematic view illustrating an example of the fuel vapor control apparatus.
Figure 10:
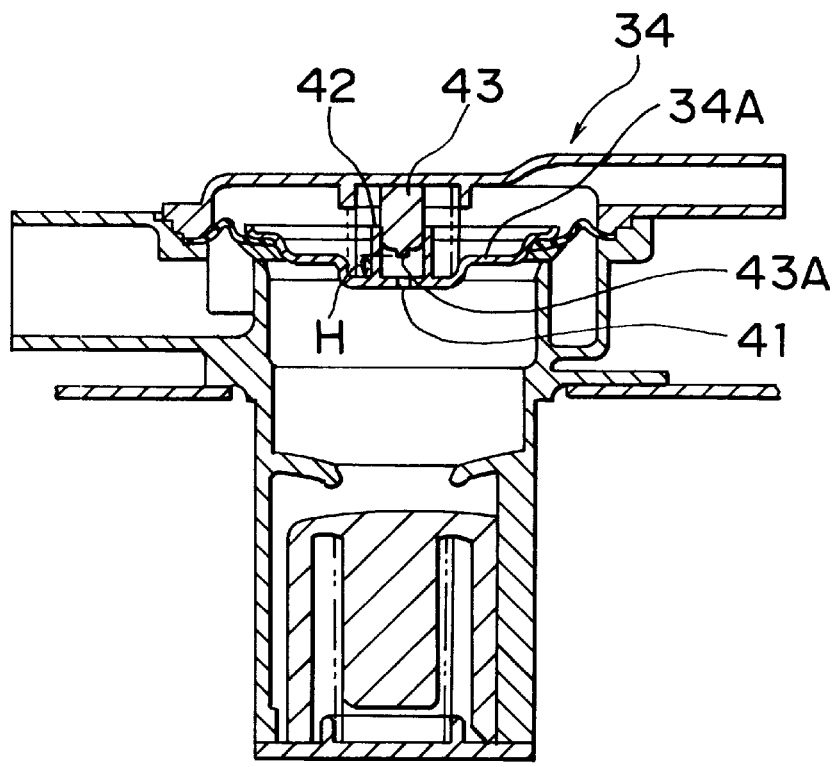
FIG. 10 is a sectional view illustrating an example of the fuel vapor control apparatus.
Figure 11:
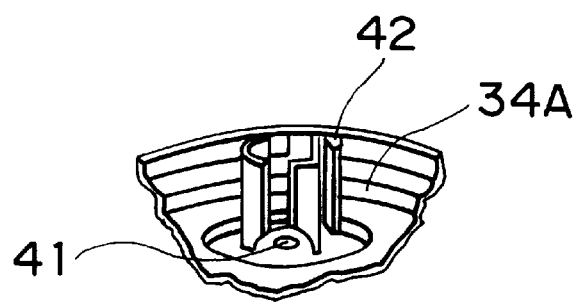
FIG. 11 is a perspective view illustrating an example of the fuel vapor control apparatus.

To ensure that the diaphragm holder 6 airtightly holds the diaphragm valve 4 as shown in FIG. 7, it is generally considered to provide a structure wherein a sealing portion 4A protruding from the diaphragm valve 4 is in contact with the diaphragm holder 6.

However, the structure wherein the sealing portion 4A is in contact with the diaphragm holder 6 results in waviness W on top and bottom faces of the diaphragm valve 4. The waviness W, which emerges on the top and bottom faces of the diaphragm valve 4, results from a distortion caused by the sealing portion 4A. The waviness W causes an insufficient contact state between the abutment portion S and the diaphragm valve 4 and may jeopardize the sealability. To eliminate the waviness W, it is considered to provide a structure described as follows.

That is, a circumferential groove 4B is formed in a radially inward portion of each of the top and bottom faces of the diaphragm valve 4. The circumferential groove 4B eliminates a distortion that results in the waviness W on the top and bottom faces of the diaphragm valve 4.

Although the structure according to the present embodiment is provided with only one circumferential groove 4B, the number of circumferential grooves 4B to be provided is not limited. For example, it is also possible to provide a structure having two or more circumferential grooves 4B.

The circumferential groove 4B may be U-shaped, square, V-shaped or in any other appropriate shape.

Although the circumferential groove 4B is formed in each of the top and bottom faces of the diaphragm valve 4 in the present embodiment, the present invention also incorporates a structure wherein the circumferential groove 4B is formed in either the top face or the bottom face of the diaphragm valve 4.

According to the aforementioned embodiments as shown in FIGS. 1 through 4, at the time of fuel supply, the fuel drop passage is closed before the diaphragm valve is opened. It is thus possible to prevent fuel vapor generated at the time of fuel supply from being discharged into the atmosphere through the filler pipe. Except at the time of fuel supply, the fuel accumulated in the upper chamber can be returned to the fuel tank. It is thus possible to avoid inconveniences where the diaphragm valve cannot be opened under a predetermined pressure obtained from a target weight of fuel and the process of feeding fuel becomes impossible, and to prevent a deterioration in operating characteristics of the fuel vapor control valve.

In a structure wherein the diaphragm valve is provided with circumferential grooves, the circumferential grooves eliminate a distortion of the diaphragm valve and prevent the emergence of waviness on the surface thereof, thus improving sealability between the diaphragm holder and the diaphragm valve.

While the present invention has been described with reference to what are presently considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single element or embodiment, are also within the spirit and scope of the invention.

What is claimed is:

1. A fuel vapor control apparatus comprising:
   a fuel tank;
   a filler pipe having one end connected with said fuel tank and another end cooperable with a filler cap;
   a canister for adsorbing fuel vapor generated in said fuel tank;
   a fuel vapor control valve disposed in a passage that allows communication between said fuel tank and the canister and divided into an upper chamber and a lower chamber, said fuel vapor control valve being opened or closed due to a difference in pressure between the upper chamber and the lower chamber;
   a fuel drop passage allowing communication between said upper chamber and said lower chamber; and
   a line connecting an inside of said upper chamber with a portion close to an end of said filler pipe near the filler cap,
   wherein said fuel vapor control valve has a valve mechanism that opens said fuel drop passage when substantially equal pressures are applied to said upper chamber and said lower chamber and closes said fuel drop passage when said lower chamber is higher in pressure than said upper chamber, before the fuel vapor control valve is opened.

2. A fuel vapor control apparatus comprising:

a fuel tank;

a filler pipe having one end connected with said fuel tank and another end cooperable with a filler cap;

a canister for adsorbing fuel vapor generated in said fuel tank;

a fuel vapor control valve disposed in a passage that allows communication between said fuel tank and the canister and divided into an upper chamber and a lower chamber, said fuel vapor control valve being opened or closed due to a difference in pressure between the upper chamber and the lower chamber;

a fuel drop passage allowing communication between said upper chamber and said lower chamber; and a line connecting an inside of said upper chamber with a portion close to an end of said filler pipe near the filler cap, wherein said fuel vapor control valve is provided with a diaphragm portion made of a flexible material and a diaphragm holder having an umbrella portion and coupled to said diaphragm portion to move integrally therewith, said umbrella portion closing said fuel drop passage at the time of fuel supply and wherein said fuel drop passage is composed of a communication hole formed in said diaphragm portion.

3. The fuel vapor control apparatus according to claim 2, wherein at the time of fuel supply, said umbrella portion closes said fuel drop passage before said fuel vapor control valve is opened.

4. The fuel vapor control apparatus according to claim 2, further comprising:

a sealing structure disposed outward of the communication hole to seal a gap between the diaphragm holder and the diaphragm portion.

5. The fuel vapor control apparatus according to claim 4, wherein the sealing structure is composed of an abutment portion extending in a circumferential direction.

6. The fuel vapor control apparatus according to claim 5, wherein the abutment portion is integrated into the diaphragm portion.

7. The fuel vapor control apparatus according to claim 5, wherein the abutment portion is integrated into the diaphragm holder.

8. The fuel vapor control apparatus according to claim 2, wherein said diaphragm holder is coupled to said diaphragm portion in a vicinity of a center thereof and wherein a circumferential groove is formed in a top face of said diaphragm portion at a location radially inward of said communication hole.

9. The fuel vapor control apparatus according to claim 2, wherein said diaphragm holder is coupled to said diaphragm portion in a vicinity of a center thereof and wherein a circumferential groove is formed in a bottom face of said diaphragm portion at a location radially inward of said communication hole.

10. The fuel vapor control apparatus according to claim 2, wherein said diaphragm holder is coupled to said diaphragm portion in a vicinity of a center thereof and wherein a circumferential groove is formed in each of top and bottom faces of said diaphragm portion at a location radially inward of said communication hole.

11. A fuel vapor control apparatus comprising:

a fuel tank;

a filler pipe having one end connected with said fuel tank and another end cooperable with a filler cap;

a canister for adsorbing fuel vapor generated in said fuel tank;

a fuel vapor control valve disposed in a passage that allows communication between said fuel tank and the canister and divided into an upper chamber and a lower chamber, said fuel vapor control valve being opened or closed due to a difference in pressure between the upper chamber and the lower chamber;

a fuel drop passage allowing communication between said upper chamber and said lower chamber; and a line connecting an inside of said upper chamber with a portion close to an end of said filler pipe near the filler cap, wherein said fuel vapor control valve is provided with a diaphragm portion having a check valve that closes said fuel drop passage at the time of fuel supply and wherein said fuel drop passage is composed of a communication hole formed in said diaphragm portion.

12. The fuel vapor control apparatus according to claim 11, wherein at the time of fuel supply, said check valve closes said fuel drop passage before said fuel vapor control valve is opened.

13. The fuel vapor control apparatus according to claim 12, wherein said check valve is composed of a duck bill valve.

14. The fuel vapor control apparatus according to claim 12, wherein said check valve is composed of an umbrella valve.

* * * * *